United States Patent [19]
Shimagaki et al.

[11] Patent Number: 5,938,929
[45] Date of Patent: Aug. 17, 1999

[54] POLYSULFONE HOLLOW FIBER SEMIPERMEABLE MEMBRANE

[75] Inventors: Masaaki Shimagaki, Shiga-ken; Fumiaki Fukui, Kyoto-fu; Takeshi Sonoda, Kanagawa-ken; Koji Sugita, Shiga-ken, all of Japan

[73] Assignee: Toray Industries, Inc., Japan

[21] Appl. No.: 08/672,673

[22] Filed: Jun. 28, 1996

[30] Foreign Application Priority Data

Jun. 30, 1995 [JP] Japan ................................... 7-164991
Jun. 30, 1995 [JP] Japan ................................... 7-166462
Jun. 30, 1995 [JP] Japan ................................... 7-166463

[51] Int. Cl.$^6$ .................................................. B01D 61/00
[52] U.S. Cl. ............... 210/645; 210/500.23; 210/500.41; 210/644
[58] Field of Search ..................... 210/644, 645, 210/500.23, 500.41, 646; 264/48, 49, 41

[56] References Cited

U.S. PATENT DOCUMENTS

| | | | |
|---|---|---|---|
| 4,906,375 | 3/1990 | Heilmann | 210/500.23 |
| 4,935,140 | 6/1990 | Konstatin et al. | 210/500.23 |
| 5,232,601 | 8/1993 | Chu et al. | 210/646 |
| 5,240,614 | 8/1993 | Ofsthun et al. | 210/500.41 |
| 5,340,480 | 8/1994 | Kawata et al. | 210/500.23 |
| 5,376,294 | 12/1994 | Muller et al. | 210/500.41 |
| 5,436,068 | 7/1995 | Kobayashi et al. | 428/308.4 |
| 5,543,465 | 8/1996 | Bell et al. | 210/500.41 |

FOREIGN PATENT DOCUMENTS

| | | |
|---|---|---|
| 0 168 783 | 1/1986 | European Pat. Off. . |
| 0 509 633 A1 | 10/1992 | European Pat. Off. . |
| 0 509 663 A1 | 10/1992 | European Pat. Off. . |
| 57-147488 | 9/1982 | Japan . |
| 59-103671 | 6/1984 | Japan . |
| 61-238834 | 10/1986 | Japan . |
| 61-245805 | 11/1986 | Japan . |
| 63-97205 | 4/1988 | Japan . |
| 4-300636 | 10/1992 | Japan . |
| 5-54373 | 8/1993 | Japan . |
| 6-23813 | 2/1994 | Japan . |
| 6-165926 | 6/1994 | Japan . |

*Primary Examiner*—Ana Fortuna
*Attorney, Agent, or Firm*—Nixon & Vanderhye

[57] ABSTRACT

Respective hollow fiber membranes suitable for use in removing undesired contaminants from blood, in particular in an artificial kidney, have:

(1) per membrane area of 1.6 m$^2$, in vitro clearances for urea and phosphorus respectively of $\geq 195$, and $\geq 180$, ml/min, a $\beta_2$-microglobulin clearance $\geq 44$ ml/min and an albumin permeability $\leq 0.5\%$;

(2) an albumin permeability $\leq 1.5\%$ and an overall mass transfer coefficient Ko$\geq 0.0012$ cm/min; and (3) a vitamin B$_{12}$ dialyzance of $\geq 135$ ml/min and an albumin permeability $\leq 3\%$. The membranes can be prepared by spinning hollow fibers from a spinning solution comprising a polysulfone, a hydrophilic polymer, a solvent and water, the spinning solution having a viscosity x at 30° C. of 25–130 poise and a quantity y % of water given by:

$$-0.01x+1.45 \leq y \leq -0.01x+2.25.$$

The membranes can be incorporated into a hemodialyzer module by a method in which they are preimpregnated with a wetting agent, thereafter kept separate from one another by spacers and then inserted in the module.

22 Claims, No Drawings

POLYSULFONE HOLLOW FIBER SEMIPERMEABLE MEMBRANE

This invention relates to a hollow fiber semipermeable membrane and a dialyzer, especially a hemodialyzer containing a semipermeable membrane and to methods for manufacturing the membrane and dialyzer.

As a material of the membrane used for dialyzers, there were conventionally used a number of polymeric compounds such as cellulose acetate, polyacrylonitrile, poly (methyl methacrylate) and polyamide. On the other hand, polysulfone resin was initially used as an engineering plastics material. However, on account of its distinguished features in heat stability, resistance to acids and alkalis, and bio-adaptability, it has become noted as a semipermeable membrane material. In general, most of such membranes comprised of polymeric materials are deficient in affinity to blood because of their hydrophobic surfaces and are not-directly usable for blood treatment. Thus, methods were devised to render them suitable for use in a dialyzer, namely by incorporating into the membranes a hydrophilic polymer or inorganic salt as a pore forming material and removing it by dissolution to form pores and, at the same time, hydrophilically modifying the polymer surface. Among the commercially available dialyzers currently used (three of which are referred to hereinafter as "Company A's Membrane A", "Company B's Membrane B" and "Company C's Membrane C") for treatment for blood purification, that is, blood dialysis, blood filtration and dialysis, and blood filtration, those intended to keep the albumin permeability at a low level below 0.5% did not give the effects of $C_{urea} \geq 195$, $C_{phosphorous} \geq 180$ and $C_{\beta 2-MG} \geq 44$, ml/min, as explained more fully below. Although those of the cellulose system represented by cellulose triacetate (e.g. Company A's Membrane A), generally exhibit a high level of removal of low molecular weight urea, they exhibit poor $\beta_2$-microglobulin (hereinafter $\beta_2$-MG) clearance. For Company A's Membrane A, per membrane area of 1.6 m², the in vitro urea clearance is 195 ml/min or higher, the phosphorus clearance is 180 ml/min, the albumin permeability is 0.5% or less, but the 1.8 m² conversion clearance, per membrane area of 1.8 m², of $\beta_2$-MG is only about 23 ml/min. On the other hand, although the polysulfone dialyzers (Company B's Membrane B, and Company C's Membrane C) have a high capacity for removing $\beta_2$-MG, with an in vitro clearance per membrane area of 1.8 m² of at least 44 ml/min, and an albumin permeability not more than 0.5%, the in vitro clearance, per membrane area of 1.6 m², for urea is only 192 ml/min or less and for phosphorus as low as 177 ml/min. Of the dialyzers intended to keep the albumin permeability at a level of less than 1.5%, there is none which has a Ko (general mass transfer coefficient), when measured in a diffusion test with dextran having a molecular weight of 10,000, and with measurements taken after 1 hour circulation of bovine serum, which exceeds 0.0012 cm/min. As stated above the dialyzers of the cellulose system represented by cellulose triacetate (such as Company A's Membrane A) generally exhibit a high clearance of (relatively low molecular weight) urea and moreover, per membrane area of 1.6 m², the in vitro albumin permeability is 0.5% or less. However, the Ko value, when subjected to the abovementioned dextran diffusion test, is only about 0.0002 cm/min. The polysulfone dialyzers exhibit high efficiency in removal of $\beta_2$-MG, but in the abovementioned dextran diffusion test, the Ko value is about 0.0010 cm/min (Company B's Membrane B) or 0.0005 cm/min (Company C's Membrane C). Referring now more particularly to polysulfone membranes disclosed in the patent literature, many of these disclosed dialyzers give an albumin permeability of less than 3.0%. However, of these dialyzers, those giving a dialyzance of vitamin B1 $(D_{B1})$ of $\geq 135$ ml/min or more or a dialyzance of urea $(D_{urea})$ of $\geq 191$ ml/min or more per 1.3 m² area in a module or a 60% or more clearance of $\beta_2$-microglobulin in clinical use under the blood dialysis mode, are not known.

In the field of the hemodialyzers, distinguished capacities for removal of urinal toxic substances are described in JP-B-54373/1993, JP-A-23813/1994 and JP-A-300636/1992.

However, with the nowadays increasing number of long-term dialysis patients and diversification of dialysis technology, higher performance was required of the hemodialyzers. That is, in on-line filtration and dialysis and push-pull filtration and dialysis, a very high water permeability is required, and in ordinary blood dialysis, a high capacity for removal of substances of a molecular weight of 10,000 or higher such as $\beta_2$-microglobulin is required along with a high capacity for removal of lower molecular weight substances Furthermore, hitherto, research was directed towards suppression, as far as practicable, of the permeation of albumin which is a useful protein in blood. However, it was found that harmful substances accumulating in dialysis patients were strongly bonded to albumin, so membranes allowing permeation of a certain amount of albumin were called for, and there are a number of reports of the improvement of symptoms by hemodialyzers using such membranes.

However, hemodialyzers satisfying all of these requirements have not yet been obtained. For example, the polysulfone membrane disclosed in JP-B-54373/1993 is good as a hemodialyzer but is not satisfactory in that it does not provide the water permeability required in hemodialysis, hemodiafiltration and hemofiltration and removal of low molecular weight substances in blood dialysis. The polysulfone membrane disclosed in JP-B-300636/1992 provides a satisfactory water permeability but does not have sufficient capacity for removing uremic toxins, particularly those having a high molecular weight such as $\beta_2$-microglobulin. Moreover, it involves problems in production. For example, during manufacture of the hemodialyzer, when incorporating the obtained hollow fiber membrane into a hemodialyzer, potting is carried out in the presence of a wetting agent (such as glycerine) which is added in order to maintain the water permeability. However, when using the membrane disclosed in JP-B-300636/1992, the hollow fibers stick to one another so that it is difficult for the potting material such as polyurethane to permeate into the gaps of the hollow fibers, resulting in seal leakage. Thus, there is not yet provided a polysulfone hollow fiber semipermeable membrane which maintains a high blood filtration flow and low albumin permeability over many hours in clinical use and which has a high urinal toxin selective permeability.

As explained above, with particular reference to commercially available dialyzers, it has been very difficult to provide a semipermeable membrane having high capacities for both clearance of low molecular weight urinal toxins and clearance of medium molecular weight proteins such as $\beta_2$-MG, and, to our knowledge, there is no dialyzer currently available which has both of these respective capacities realized simultaneously. At least one aspect of the present invention addresses and solves this problem.

Similarly, no currently available membrane is capable of achieving, simultaneously a low albumin permeability, in particular $\leq 3$, and a high mass transfer coefficient, Ko as later defined. At least one aspect of the invention addresses and solves this problem.

In addition, as explained above with particular reference to the patent literature, it has also been particularly difficult to provide hemodialyzers capable of achieving, on the one hand an albumin permeability of less than 3% while at the same time achieving a $D_{B1}$ of $\geqq 135$ ml/min and a $D_{urea}$ of $\geqq 191$ ml/min (each per membrane area of 1.3 m$^2$) and a % $\beta_2$-MG reduction $\geqq 60\%$. At least one aspect of the invention addresses and solves this problem.

Thus, according to a first aspect, the invention provides a hollow fiber membrane, such as a hemodialyzer, hemodiafilter or hemuofilter, having (i) an albumin permeability of 0.5% or less;

(ii) per membrane area of 1.6 m$^2$, an in vitro urea clearance of 195 ml/min or more;

(iii) per membrane area of 1.6 m$^2$, an in vitro phosphorus clearance of 180 ml/min or more; and (iv) per membrane area of 1.8 m$^2$, a $\beta_2$-microglobulin clearance of 44 ml/min or more.

According to a second aspect, the invention provides a polysulfone hollow fiber semipermeable membrane characterized by an albumin permeability of less than 1.5% and, in a dextran diffusion test using a dextran having a molecular weight of 10,000 and after 1 hour circulation of bovine serum, an overall mass transfer coefficient Ko of 0.0012 cm/min or more.

Another aspect provides such a membrane according to the above first or second aspects of the invention for use in the treatment of blood for removal therefrom of any undesired component, in particular use as an artificial kidney membrane, while yet another aspect provides the use of such a membrane for in vitro treatment of blood.

Membranes and hollow fiber membrane artificial kidneys comprising such membranes provided by the above aspect of the present invention are obtainable, for example, by a method described as follows. This method uses a stock solution obtainable by adding, to a solution having a main hydrophobic polymer and a main hydrophilic polymer admixed and dissolved in a solvent, an additive serving as a non-solvent or swelling agent for the main hydrophobic polymer.

A preferred specific method of preparing the stock solution for use in a method of the present invention will now be described in more detail.

The stock solution basically comprises a 4 component system of (1) polysulfone resin, (2) hydrophilic polymer, (3) solvent and (4) additive.

The polysulfone resin referred to here may comprise repeating units of the formula (1), and it may include, either on these or other residues, a functional group. Moreover, any or all of the phenylene groups may be replaced by alkylene groups.

The hydrophilic polymer (2) is a polymer having a compatibility with the polysulfone resin as well as a hydrophilic property. Polyvinyl pyrrolidone is most desirable, but other polymers which may be present additionally or alternatively to the polyvinyl pyrrolidone include a modified polyvinylpyrrolidone, for example, a polyvinyl pyrrolidone copolymer, poly(ethylene glycol) and poly(vinyl acetate). It should be chosen as appropriate for compatibility with the main polysulfone polymer.

The solvent (3) should dissolve both the polysulfone resin (1) and hydrophilic polymer (2). As such solvents, a variety of solvents may be used, including dimethyl sulfoxide, dimethyl acetamide, dimethyl formamide, N-methyl-2-pyrrolidone and dioxane, but dimethyl acetamide, dimethyl sulfoxide, dimethyl formamide and N-methyl-2-pyrrolidone are particularly preferable.

For the additive (4), any material can be used so long as it is compatible with the solvent (3) and serves as a good solvent for the hydrophilic polymer (2) and a non-solvent or swelling agent for the polysulfone resin (1), and, in particular such a material may be water, methanol, ethanol, isopropanol, hexanol or 1,4-butanediol. However, considering the cost of production, water is most preferable. The additive (4) should be chosen with the coagulation of the polysulfone resin (1) taken into consideration.

Howsoever and which of these components are combined is optional, and it will be a matter of ease for those skilled in the art to select a particular combination giving the desired coagulation property. Furthermore, either or both of the solvent (3) and additive (4) respectively may be a mixture of two or more compounds.

In the case of a stock solution containing a polysulfone resin, hydrophilic polymer and solvent such as that for use in a method embodying the present invention, the additive (4) is to be carefully chosen for the poly-sulfonic resin (1). In particular, it should be free from mutual interaction with the polysulfone resin (1), such that the polysulfone resin (1) maintains a homogenous system on account of the additive (4) to such a concentration at which it coagulates as a matter of course and has no phase separation produced in a system having no hydrophilic polymer (2) admixed. Here, if the temperature is raised, the molecular motion increases to weaken the bond particularly between the hydrophilic polymer (2) and the additive (4), then the hydrogen bond is broken, and so the apparent concentration of the additive (4) which is not bonded to the polysulfone resin (1) increases over that at the initial temperature T, resulting in mutual interaction between the polysulfone resin (1) and the additive (4) with consequent coagulation and phase separation of the polysulfone resin (1). When the quantity of the additive (4) in this system is increased, the stock solution system at the temperature T has the additive (4) added in an amount in excess of the amount held by the hydrophilic polymer (2) at the temperature T, and so the membrane forming stock solution undergoes a phase separation. However, when the

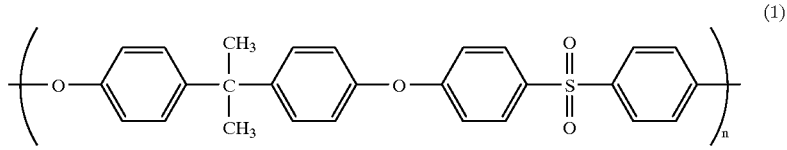

temperature is lowered, molecular motion of the hydrophilic polymer (2) is reduced to increase the amount of bonding of the additive (4) and thus decrease the apparent concentration of the additive (4), and so the system becomes homogeneous again. If the temperature is raised again, the system becomes inhomogeneous, but with the hydrophilic polymer (2) added, the amount of the additive (4) bonding with the hydrophilic polymer (2) increase to give a homogeneous system.

A preferred range of concentrations of the polysulfone resin (1) which can allow formation of a membrane having the characteristics desired for a hollow fiber membrane dialyzer of the present invention is 13–20% by weight of the solution. To obtain a high water permeability and a large fractional molecular weight, the polymer concentration should be somewhat reduced, and it is more preferably 13–18% by weight. If it is less than 13% by weight, a sufficient viscosity of the membrane forming stock is difficult to obtain, making it difficult to form a membrane. If it exceeds 20% by weight, hardly any penetrating pores are formed.

The hydrophilic polymer (2) or, more specifically, polyvinylpyrrolidone is commercially available in molecular weights of 360,000, 160,000, 40,000 and 10,000, and such a polymer is conveniently used, although a polymer of any other molecular weight can of course be used. The hydrophilic polymer (2) suitable for the hollow fiber membrane dialyzer is preferably added, particularly in the case of polyvinylpyrrolidone, in an amount of 1–20% by weight or, more preferably, 3–10% by weight, but the amount added is governed by the molecular weight of the polyvinylpyrrolidone. When the amount added is too small, hardly any phase separation occurs, and when the polymer concentration is high and the polymer molecular weight is too large, washing after formation of the membrane becomes difficult. Thus, one of the methods for obtaining a satisfactory membrane is to use polymers of different molecular weight and have them mixed to assume the roles desired of them.

In order to prepare the solution, the polymers (1) and (2) may be admixed, the mixture dissolved in the solvent (3), then the additive (4) added. In the case of water in particular, it is highly coagulative for the polysulfone polymer of the formula (1), so it should be strictly controlled, preferably to an amount of 1.8 percent by weight or less or, more preferably, 1.05–1.70% by weight. in the case of polyacrylonitrile, it is especially preferable to add this in an amount of 2–6% by weight. When a less coagulative additive (4) is used, the amount added increases as a matter of course. Adjustment of the added amount of such a coagulative additive has a relationship with the equilibrium moisture content of the hydrophobic polymer. As the concentration of the additive (4) increases, the phase separation concentration of the membrane forming stock solution decreases. The phase separation temperature should be determined in consideration of the pore radius of the desired membrane. Typically the membrane is formed by a wet or dry/wet spinning process, preferably a dry/wet spinning process in which the solution passes through a dry zone containing a gas, typically air, at a predetermined relative humidity and thereafter through a coagulating bath containing a coagulating agent. In such a process, in the dry zone a preferred relative humidity is 60–90%, a preferred temperature is 25–55° C., more preferably 30–50° C. and a preferred residence time is 0.1–1 sec, while in the coagulating bath a preferred temperature is 25–55° C., more preferably 30–50° C. The form of the hollow fiber membrane used in the dialyzer of the invention may be provided by allowing an infusing solution to flow inside the stock solution when it is discharged from the annular spinning orifice and run through a drying zone to a coagulation bath. Here, the humidity of the dry zone is very important. By supplying moisture through the outer surface of the membrane while running it through the wet section, this enables acceleration of the phase separation at about the outer surface and enlargement of the pore diameter, thus providing the effect of reducing the permeation and diffusion resistance at the time of dialysis. If the relative humidity is too high, coagulation of the stock solution on the outer surface prevails to reduce the pore diameter, resulting in an increase in the permeation and diffusion resistance at the time of dialysis. Such relative humidity is governed greatly by the composition of the stock solution, so it is difficult to define simply the optimum point, but a relative humidity of 60–90% is preferably used. For ease of processing, the infusing solution preferably comprises basically the solvent (3) used in the stock solution. The composition of the infusing solution directly affects the permeation and diffusion capacities of the activated layer, so it must be precisely determined. In the foregoing range of stock solution compositions, the composition of the infusing solution is greatly affected by the composition of the stock solution, so it is difficult to define simply the optimum point. Here, when dimethylacetamide, is used, for example, an aqueous solution of 60~75% by weight is preferably used.

It is very difficult to define the optimum membrane forming stock solution, but through combination of the properties of the four components within the above range of compositions, a particular stock solution can be chosen for providing a desired polysulfone hollow fiber semipermeable membrane of the invention.

Particular reference has been made earlier to problems arising from the methods of preparing hemodialyzers disclosed, for example, JP-B-54373/1993, JP-A-23813/1994 and JP-A-300636/1992, especially the difficulty in achieving an albumin permeability of $\leq 3\%$ while at the same time achieving, a $D_{B1}$ of at least 135 ml/min and a $D_{urea}$ of at least 191 ml/min, each per membrane area of 1.3 m$^2$ and % $\beta_2$-MG reduction $\geq 60\%$, all measured under conditions as later described.

According to at least a third aspect of the invention, membranes providing such a simultaneous combination of characteristics can be obtained.

Thus, the invention provides, according to yet another aspect, a polysulfone hollow fiber membrane having an albumin permeability $\leq 3\%$ and a $D_{B1}$ (per membrane area of 1.3 m$^2$) of $\geq 135$, preferably a $\geq 140$ ml/min, and preferably also a $D_{urea}$ (per membrane are of 1.3 m$^2$)$\geq 191$, more preferably $\geq 193$ ml/min, and also preferably a %$\beta_2$-MG reduction $\geq 60\%$, more preferably $\geq 70\%$.

In particular, by using hollow fibers obtainable by spinning a particular spinning solution (which may be as described above in relation to aspects of the invention earlier described) and infusing solution under particular conditions of the drying zone (details of which are described later), a membrane having characteristics particularly desirable for hemodialysis can be obtained, and, moreover, a hemodialysis module containing such membranes can be provided without deterioration of the membrane, thereby maintaining such desired characteristics. For such a purpose, the module is fabricated with a sufficient amount of a wetting agent imparted to the hollow fibers, and after the wetting agent has been removed, the hollow fibers can be filled with water to give a desired product. Here, if the bundle of hollow fibers is provided with the wetting agent imparted to the hollow fibers, the hollow fibers stick to one another to make it difficult to form a sealing plate by the potting material, according to one aspect of the invention, so in a more preferable method, spacers are inserted to prevent adhesion.

That is, according to one aspect of the invention, a polysulfone hollow fiber type hemodialyzer is manufactured by a method characterized by preparing a bundle of hollow fibers with a sufficient amount of a wetting agent imparted to the hollow fibers, forming them into at least one sealing plate, preferably a pair of sealing plates, one at each respective opposite axial end region of the hollow tubular fibers, then rinsing the wetting agent with water and sterilizing, which hemodialyzer is thereby capable of exhibiting an albumin permeability of 3.0% or less and a vitamin $B_{12}$ dialyzance, per membrane area of 1.3 m$^2$, of 135 ml/min or higher.

Furthermore, according to this manufacturing method, by employing preferable conditions described herein, it is possible to obtain a hemodialyzer which is characterized by an albumin permeability of 0.1% to 2.4% and a vitamin 12 dialyzance of 137 ml/min or higher. Moreover, through as combination of more preferable conditions, it is possible to obtain a hemodialyzer which is characterized by an albumin permeability of 0.3% to 2.0% and a vitamin $B_{12}$ dialyzance of 140 ml/min or higher.

Also, by employing more and more preferable manufacturing conditions in the manufacturing method of the present invention, it is possible to obtain a hemodialyzer exhibiting a urea dialyzance of 191 ml/min or higher, 192 ml/min or higher, and even 193 ml/min or higher.

Furthermore, according to the method of the present invention, again by employing more and more preferable conditions, a hemodialyzer having a hollow fiber membrane exhibiting a water permeability as high as 500 ml/hr.mmHg.m$^2$ or higher, 600 ml/hr.mmHg.m$^2$ or even 700 ml/hr.mmHg. m$^2$ or higher is obtainable. Indeed, a hollow fiber membrane obtained by a method of the present invention and giving the best clinical evaluation exhibited a water permeability higher than 800 ml/hr.mmHg.m$^2$.

The % removal of $\beta_2$-microglobulin and the dialyzance of vitamin $B_{12}$ in clinical evaluation are positively correlated, and the vitamin $B_{12}$ dialyzance may be regarded as the best index of the membrane capacity.

Preferred conditions and process steps in methods embodying the invention are now described.

The concentration of the polysulfone resin in the spinning solution in the manufacturing method according to the invention is preferably 14–22% by weight and more preferably 17–19% by weight.

The concentration of the hydrophilic polymer is preferably 5–12% by weight and more preferably 7–10% by weight.

For obtaining a hollow fiber membrane of good characteristics particularly as a hemodialyzer by spinning at a high speed (which is desirable for reasons of economy), the viscosity of the spinning solution is an important factor. Too low a viscosity is not preferred in that end breakage or variation of hollow fiber diameter occurs while control of the albumin permeability becomes difficult. On the other hand, too high a viscosity is not preferred in that variation of the thickness of the hollow fiber membrane is enlarged while its capacity to clear urinal toxic substances is reduced.

In the spinning solution according to the manufacturing method of the invention, especially if dimethylacetamide is used as a solvent, the viscosity at 30° C. is preferably within the range of 25–130 poise (about 35–170 poise at 20° C.) or, more preferably, 40–110 poise.

Control of the viscosity may be made through adjustment of the concentration and/or molecular weight of the polysulfone resin and/or concentration and/or molecular weight of the hydrophilic polymer in the spinning solution. The most preferable method is to change the molecular weight of the hydrophilic polymer.

For example, a desired Viscosity may be provided by mixing polyvinylpyrrolidone (K-30) of a weight average molecular weight of about 40,000 and polyvinylpyrrolidone (K-90) of a weight average molecular weight of about 1,100,000 and changing the mixing ratio.

In a preferred specific example, where dimethylacetamide is used as a solvent, AMOCO Corporations's Polysulfon P-3500 used in a concentration of 18% by weight, and polyvinylpyrrolidone used in a concentration of 9% by weight, the mixing ratio of K-30 and K-90 is within the range of about 9/0–5/4 or, more preferably, about 8/1–5.5/3.5.

In the spinning solution used in a method according to the present invention, it is preferable to add a small amount of water as an agent to regulate the pore diameter in the hollow fiber membrane.

Thus, according to a particular method aspect of the invention there is provided a method of manufacturing a polysulfone hollow fiber membrane, which method comprises spinning hollow fibers from a spinning solution comprising a polysulfone, a hydrophilic polymer, a solvent for each of the polysulfone and hydrophilic polymer and water, which spinning solution has a viscosity x (poise) at 30° C. within the range of 25–130 poise and a quantity y (wt %) of water present in the spinning solution within the range satisfying the formula $$-0.01x+1.45 \leq y \leq -0.01x+2.25.$$

When such a method is employed and more particularly, when the most preferred solvent, dimethylacetamide is used, a hollow fiber membrane of good characteristics is obtainable. When the water quantity y (wt %) contained in the solution is within the range satisfying the formula $$-0.01+1.65 \leq y \leq 0.01x+2.05,$$

it is more preferable. In the above formulae, x represents the viscosity (poise) at 30° C. of the spinning solution, and x is within the range of 25–130 poise or preferably 40–110 poise.

When the amount of water added is smaller, clouding of the spinning solution due to long storage may be checked (here, it seems that the clouding occurs as the polysulfone oligomer crystallizes, and this is not desirable in that if the clouding proceeds, end breakage tends to occur in spinning), but the pore diameter is reduced to reduce the capacity of the membrane for clearing substances of a molecular weight of 10,000 or higher such as $\beta_2$-microglobulin, and this is not desirable. Conversely, when the amount of water added is greater, this is not desirable in that the spinning solution tends to lose stability and cause clouding, and furthermore the albumin permeability becomes too high.

Moreover, in a preferred manufacturing method of the invention, an infusing solution is extruded from the center of the spinneret to control the inner surface of the hollow fiber by its coagulation and thus provide a membrane having good characteristics as a hemodialyzer. The infusing solution is generally used for the purpose of gradually coagulating the spinning solution from the inner surface of the hollow fiber to form an asymmetric structure, preferably having an overall porosity of at least 78% and preferably having a fine active layer of the separation membrane, which preferably has an average pore radius $\leq 10$ nm, more preferably $\leq 8$ nm, especially $\leq 7$ nm. Hence the infusion fluid is preferably low in its ability to cause coagulation, and an organic solvent such as alcohol is usable independently or in a mixture with water.

According to the present invention, a mixture of the solvent used for the spinning solution and water is preferable for ease of recovery and for obtaining high performance, and a mixed solvent of dimethylacetamide, which is the most preferable solvent, and water is more preferable.

When a mixture solvent of dimethylacetamide and water is used, the quantity of water z (weight %) contained in the infusing solution is defined by the viscosity of the spinning solution in order to obtain a membrane having good characteristics as a hemodialyzer of the invention, and it is preferably in the range satisfying the formula $$0.14x+25.5 \leq z \leq 0.14x+37.5$$

and it is more preferable that the water quantity z (weight %) contained in the infusing solution is in the range satisfying the formula $$0.14x+28.5 \leq z \leq 0.14x+34.5$$

where x is the viscosity (poise) of the spinning solution at 30° C. and x is within the range of 25–130 poise or more preferably 40–110 poise.

A membrane having good characteristics as a hollow fiber membrane for hemodialysis is obtainable by having both water quantity y (weight %) in spinning solution and water quantity z (weight %) in infusing solution to satisfy the foregoing formulae respectively.

If the water content is less, coagulation of the spinning solution or that from the inner surface is slow, tending to cause end breakage in the drying zone and higher permeation of proteins including albumin. Likewise, an excessive water quantity is not preferable in that the capacity of the membrane to remove substances of greater molecular weight such as $\beta_2$-microglobulin is reduced. On the other hand, its capacity to remove low molecular substances is also reduced as the water content is increased further.

The hollow fiber membrane of the present invention may be spun by the wet spinning method according to which the spinning solution and infusing solution provided as stated above are directly led from the annular nozzle spinneret to the coagulation bath or by the dry/wet spinning method according to which the hollow fiber from the spinneret is once exposed to a gaseous phase then led to the coagulation bath. Here, in order to obtain good performance, the dry/wet spinning method having the fiber run in the gaseous phase (drying zone) preferably for 0.1–1.0 second or, more preferably, 0.2–0.8 second is desirable.

As the condition of the drying zone, a relative humidity of 40% or more is preferred, and a good performance is provided through contact with a moist air flow of a relative humidity of preferably at least 60%, even more preferably 70% or higher, most preferably 80% or higher, say up to 90%.

Next, the spinning solution, now in the form of hollow fiber spun out of the spinneret is led to the coagulation bath. In the coagulation bath, it comingles with the solvent, but as it comes into contact with the coagulating solution which is a non-solvent having a property to coagulate the polysulfone resin, it forms a membrane of a structure in the form of a coarse porous sponge as a supporting layer from the side of the outer surface.

For the coagulation bath, a non-solvent or a mixture of two or more non-solvents may be used, but from the point of view of recovery of the solvent, a mixture of the solvent of the spinning solution and water is preferably used.

The hollow fiber coming out of the coagulation bath is rinsed with water for removal of a substantial part of the solvent component, and it is immersed in a solution of a wetting agent, cut to a predetermined length and assembled to provide a predetermined number of fibers. Then, the solution of the wetting agent, which has substituted the infusing solution inside the hollow fiber at the time of immersion, is removed to form a bundle of hollow fibers.

For the wetting agent, there may be used an alcohol such as glycerine, ethylene glycol, polypropylene glycol or polyethylene glycol which prevents drying of the bundle of hollow fibers even when it is allowed to stand in air or an aqueous solution of an inorganic salt; however, glycerine is particularly preferable.

It is especially preferred to use an aqueous solution of glycerine, preferably containing 50% or more by weight, more preferably 60–75% by weight, still more preferably 65–72% by weight of glycerine in order to prevent deterioration of the permeability of the membrane through drying.

Imparting the wetting agent may prevent deterioration of the membrane performance while fabricating it into a hemodialyzer. However, conversely, in forming a sealing plate by means of a potting material such as a polyurethane, a problem arises in that adhesion of the hollow fibers to one another tends to occur and this renders it very difficult for the potting material to permeate into the gaps of the hollow fibers, resulting in seal leakage precluding separation of blood and dialyzate by the sealing plate. In order to resolve such a problem, a method which may be employed is that of storing the bundle of hollow fibers in an atmosphere of low humidity for a long period of time after it has been inserted into a casing of the hemodialyzer (for example, storing in a room of a relative humidity of 40% for about 3 days) or that of loosening the ends of the fiber bundle by applying an air flow of a very low humidity to end parts, then a strong air flow in a vertical direction to both end faces, of the hollow fiber bundle (for example, applying air at a temperature of 40–50° C. and a relative humidity of 10% or less to both end parts of the casing for about 2 hours, then blowing air strongly in a vertical direction upon the end parts to loosen the hollowfibers at the end parts) before formation of the sealing plate. However, the more preferable method is to introduce spacers for preventing adhesion of the hollow fibers to one another during the process before preparation of the hollow fiber bundle after the wetting agent has been added.

When used as a hemodialyzer, this method of introducing the spacers has also another effect of allowing the dialyzate to flow to the central part of the hollow fiber bundle to enhance the dialytic performance. Introduction of the spacers may be implemented by imparting spacer yarns of polyester, polyamide, polyacrylonitrile, cellulose acetate, silk or cotton along, or helically winding them around, one or two hollow fibers.

To completely prevent the seal leakage by such a method, it may be necessary to use a thick spacer yarn of a diameter of about one half or more (about 120 microns or more) of the outer diameter of hollow fiber, leading to a greater diameter of the case of the hemodialyzer, and this is not so preferable. A more preferable method is to introduce spacers in two steps, as described below. That is, in the first step, unit hollow fiber elements are produced by the method of either imparting or helically winding spacer yarns of polyester or the like along or around one or two hollow fibers and, in the second step, bundles of hollow fibers are provided by helically winding the spacer yarns as spacers around an aggregate of four or more said unit hollow fiber elements, and five or more of said hollow fiber bundles are assembled into a bundle of a specified number of hollow fibers for a hemodialyzer. In this case, the unit hollow fiber elements are preferably provided by the helical winding method.

For the spacer yarns introduced in the first and second steps, relatively bulky and stretchable crimped fibers, finished yarns and spun yarns are preferably used. In addition, their thickness is preferably finer than that of the polysulfone hollow fiber, more preferably about 1/20 of the outer diameter of hollow fiber, and a fineness of 1/2 to 1/10 of the outer diameter of hollow fiber is preferable.

Such introduction of spacers facilitates formation of the sealing plate under conditions where the wetting agent is imparted in a concentration (quantity) sufficient to prevent deterioration of the performance of the membrane by drying, and by this procedure, hemodialyzers having a high water permeability and a high capacity for removal of urinal toxic substances and having an albumin permeability controlled to 3% or less, are obtainable in a high yield.

Fabrication (modulation) of the bundles of hollow fibers thus obtained into hemodialyzers is practicable by any conventional method.

That is, for example, fiber bundles are inserted in a case of, say, polystyrene resin, and using a potting material such as a polyurethane, a sealing plate through which the hollow fibers pass is formed at each end of the case using a centrifugal force, then a leak test is performed before the bundles are formed into the hemodialyzer.

Next, the very small amount of solvent and wetting agent which may remain in the hollow fiber membrane is removed by washing with water, then sterilization is carried out while water fills the membrane to provide a desired hemodialyzer product. Washing may be carried out using water at about room temperature, up to, say, 90° C., but is preferably carried out at a temperature of at least 40° C. In particular, it takes a period of about 2 hours at 55° C. or 15 minutes at 80° C., so washing with warm water at 55° C. or higher is especially preferable. It is also possible to employ repeated washing, for example, washing for a short time, then warming at 50° C. or higher, and again washing for a short time.

In the case of a blend membrane additionally containing a water-soluble hydrophilic polymer, there is a danger of dissolution of the hydrophilic polymer when used for medical purposes.

Here, it is possible to cross-link the hydrophilic polymer and thus make it insoluble by radiation and/or heat. Specifically, a heat treatment (about 120° C.) may be given, or gamma-rays or electron beams may be irradiated under wet conditions. The exposure dose is adequately 15–35 KGy under a submerged condition. When a dose exceeding 20 KGy is irradiated, it is possible to carry out a sterilizing treatment simultaneously. Radiation of gamma-rays or electron beams produces covalent bonds with the polymer materials, and the dissolution of the hydrophilic polymer is checked. In the case of the heat treatment, the hydrophilic polymer itself gels into a higher molecule and insoluble form. For sterilization, any conventional method is applicable, that is, sterilization with hot water of at 90° C. or higher or sterilization by radiation using gamma-rays or electron beams under the water filled condition. Sterilization by radiation using gamma-rays or electron beams is a preferable method in that it renders the hydrophilic polymer in the membrane insoluble through cross-linking. When using polyvinylpyrrolidone which is the most preferable hydrophilic polymer present in a membrane according to the invention, radiation of gamma-rays in a dosage within the range of about 20 KGy–35 KGy causes insolubility through cross-linking of the polyvinylpyrrolidone along with sterilization as required for medical equipment, and hence this is the most practical method of sterilization.

Radiation sterilization gives rise to insolubility through cross-linking of polyvinylpyrrolidone simultaneously and thus checks the dissolution of the polymer and enhances the safety of the product. In addition, by this method, it is possible to allow much more polyvinylpyrrolidone to be present in the hollow fibers of the product to provide a membrane having good affinity with water and thus exhibit the high performance attainable by membranes embodying the present invention. For insolubility through cross-linking of polyvinylpyrrolidone, it is of course possible to separately apply radiation before sterilization, but it is preferable for obtaining a membrane of high performance to simultaneously implement the cross-linking and sterilization by radiation.

Preferred embodiments of the invention will now be described in more detail with reference to the following Examples in which parts are by weight unless otherwise stated.

Evaluation of the performance of membranes according to the invention was made by the following methods.

(1) Water Permeability

Using 30 hollow fibers of a length of about 15 cm obtained by cutting the case of a completed hemodialyzer product i.e. subsequent to its radiation by gamma-rays, a small glass tube module is prepared by repotting respective opposite ends of the fibers, and the differential pressure between the inside and outside of the membrane, that is, intermembrane differential pressure, is measured by permeation of water at a pressure of about 100 mmHg and expressed in ml/hr.mmHg.m². The water permeation performance was calculated by the following formula.

$$UFR(ml/hr/m^2/mmHg) = Qw/(P \times T \times A)$$

where Qw is the amount of the filtrate (ml), T the efflux time (hr), P the pressure (mmHg), and A the area of the membrane (m²) (in terms of the area of the inner surface of the hollow yarn).

(2) Determination of Diffusion by Dextran

Basically, this measurement is made similarly to that of the dialytic capacity. It is generally as follows. Firstly, a hollow fiber membrane dialyzer has a blood side thereof perfused with 500 ml of warmed bovine serum at 37° C. at 200 ml/min for 50 minutes but without any flow of the dialysate, then the dialysate is removed and filtration, controlled by the flow rate of the perfusate, occurs at a rate of 20 ml/min for 10 minutes (the foregoing process being regarded as 1-hour circulation of bovine serum). After storing for 12 hours in a refrigerator, the dialyzer is washed by priming with two liters of physiological salt solution before it is used for testing. Dextrans of respective varying molecular weights (FULKA's product, weight-average molecular weights of 400, 1000, 2000, 20000, 50000 and 200000) are each dissolved in water for ultrafiltration at respective concentrations each of 0.5 mg/ml so as to provide a solution containing 3 mg/ml of dextran with a distribution therein of molecular weights. This solution is warmed up to 37° C., and fed to the blood side (inside of the hollow fibers) by a blood pump at a flow rate of 200 ml/min, while the dialyzate side has ultrafiltrated water kept at 37° C. and fed at 500 ml/min in countercurrent flow to that of the blood. Here, the filtering pressure should be adjusted to zero. Accordingly, the diffusing capacity of the membrane is determined under conditions under which no ultrafiltration is caused. Feeding is continued for 20 minutes until an equilibrium state is established, then samples are taken at the inlet and outlet of the blood side and the dialyzing side. Sample solutions are subjected to analysis by a GPC column (TOSO GPXL3000) at a column temperature of 40° C., and the transfer phase at 1 ml/min of pure water for liquid chromatography and sample drive of 50 μl. The general mass transfer coefficient is then obtained by determining the change of concentration at the inlet and outlet of the blood side. Thereafter, the Ko value at a point corresponding to a dextran molecular weight of 10,000 is obtained. Here, calibration must be made with dextran of a definite molecular-weight distribution used before the sample is applied to the GPC column. The general mass transfer coefficient is calculated using the following formula:

$$\text{Clearance, } Ct(ml/min) = [(CBi-CBo)/CBi]Q_B \quad (2)$$

where CBi: module inlet side concentration; CBo: module outlet side concentration; and QB: module supply liquid (perfusate) flow rate (ml/min).

General mass transfer coefficient Ko(cm/min)

$$= Q_B/[A \times 10^4 \times (1-Q_B/Q_D) \times \ln[1-(C_L/Q_D)]/[1-(C_L/Q_B)]] \quad (3)$$

where

A=area (m$^2$); and $Q_D$=dialysate flow rate (ml/min).

(3) Measurement of Albumin Permeability

Bovine blood (heparin treated blood), of hematocrit value 30% and total protein 6.5 g/dl, in fed to the inside of the hollow fiber at 200 ml/min. Controlling the outlet pressure, the filtration is adjusted to a rate of 20 ml/min, and the filtrate is returned to the blood tank. One hour after starting of refluxing, the blood and filtrate at the inlet and outlet of the hollow fiber side are sampled. Analyzing the blood side by BCG method and filtrate side by CBB method kits, the albumin permeability (%) is calculated from the concentrations:

$$\text{Albumin permeability } (\%) = \frac{2 \times C_f}{(CBi + CBo)} \times 100 \quad (4)$$

where Cf: albumin content in filtrate; CBi: albumin content at module inlet; and CBo: albumin content at the module outlet.

(4) Determination of in vitro $\beta_2$-MG Removal Capacity

Basically, this determination is made similarly to that of the dialytic capacity. In a minimodule of a membrane area of 25 cm$^2$, human $\beta_2$-MG is dissolved in a concentration of 5 mg/ml in 30 ml of prefiltered bovine serum, and the solution is perfused to the inside of the hollow fibers at a rate of 1 ml/min, while to the outside of the hollow fibers, 140 ml of phosphate buffered saline (PBS) kept at 37° C. is perfused at a rate of 20 ml/min in a closed system. After 4-hours perfusion, the solutions of perfusion on the inside and outside of the hollow fibers are collected. Then, the clearance is calculated, and its value per membrane area of 1.8 m$^2$ is obtained.

(5) Determination of the Clearances of Urea and Phosphorus

Preparing 50l of a physiological salt solution containing each of 1000 ppm of urea and 50 ppm of phosphoric acid as blood (i.e. perfusate) solution and 100l of physiological salt solution as dialysis solution, the concentrations at the blood side inlet and outlet of the dialyzer are measured with the blood flow set at 200 ml/min, dialyzate flow at 500 ml/min, and the standard clearances on the blood and dialyzate sides are calculated, and their mean values are used.

(6) Determination of Porosity

A sample is observed using a scanning electron microscope to confirm that substantial macrovoids (referring to a structure in which macrovoids open discontinuously) in the inner layer part and the porosity is calculated from the fiber weight G in a dry condition, hollow fiber membrane size (inner diameter ID and membrane thickness WT), polymer specific gravity d and hollow fiber length 1 as follows:

$$\text{Porosity } (\%) = \frac{(1 - G/d)}{\pi WTl(ID + WT)} \times 100$$

(7) Observation of Membrane Structure

Freeze drying the hollow fiber membrane, the structures of its cross-section and inner surface are observed by a scanning electron microscope. The average pore radius of the active layer is calculated through measurement of a freeze dried sample (3.5 cm length, 0.2 g) by the N2 adsorption method (BET method).

(8) (%) $\beta_2$-Microglobulin Removal

Blood dialysis is carried out upon six patients of a weight of 50 kg–60 kg and a $\beta_2$-microglobulin level of 25–35 mg/l, heparin being added to the blood during dialysis as an anti-coagulant, with a blood flow at 200 ml/min, dialyzate flow at 500 ml/min, and water removal in 4 hours at 2.5–3.5l, and the $\beta_2$-microglobulin concentrations before and after the dialysis are measured and calculated by the latex immuno-agglutination method, with compensation made for the protein concentration, and the mean value is used. The % globulin removal is calculated from $$\frac{C_{\beta 2-MC1} - [C_{\beta 2-MC2} \times (C_{tp1}/C_{tp2})]}{C_{\beta 2-MC1}} \times 100$$

where:

$C_{tp1}$ is the total protein concentration before dialysis;

$C_{tp2}$ is the total protein concentration after dialysis;

$C_{\beta 2-MG1}$ is the total $\beta_2$-M$_G$ concentration before dialysis; and $C_{\beta 2-MG1}$ is the total $\beta_2$-MG concentration after dialysis.

(9) Viscosity of Spinning Solution

30 Measurement is made using a B-type viscosimeter (TOKIMEKKU Corp., DV-B11 digital viscosimeter) and the spinning solution sampled in an amount of 300 ml or more, with care taken so that the measurement would not be affected by the inner diameter of the vessel.

(10) Dialyzances of Urea and Vitamin B$_{12}$

A perfusate for dialysis is obtained by dissolving each of 60 g of urea and 1.2 g of vitamin B$_{12}$ in 60 liters of water, concentrations of perfusate at the perfusate inlet and outlet and concentrations of dialyzate at the dialyzate inlet and outlet of the dialyzer are measured with the perfusate flow set at 200 ml/min, dialyzate flow at 500 ml/min, and filtration speed at 10 ml/min, then the blood-based and dialyzate-based dialyzances are calculated, and their mean values expressed in ml/min are employed.

EXAMPLE 1

18 Parts of a polysulfone (AMOCO's Udel-P3500) and 9 parts of polyvinylpyrrolidone (BASF K30) were added to 71.95 parts of dimethylacetamide and 1.05 parts of water, and the mixture was heated at 90° C. for 12 hours to dissolve the components into a spinning solution. This solution was extruded from an annular spinning orifice of outer diameter 0.3 mm and inner diameter 0.2 mm together with a solution consisting of 65 parts of dimethylacetamide and 35 parts of water as a core solution within a sheath of the spinning solution. The core/sheath passed from the orifice into a dry zone which is 300 mm in length and which contains air at a relative humidity of 88% and a temperature of 30° C., at a speed of 40 m/min. The core/sheath then entered a coagulating bath of a 20% aqueous dimethylacetamide solution at a temperature of 40° C., in which a hollow fiber membrane was formed. This hollow fiber membrane was inserted in a case to form a module with a membrane area of 1.6 m² with potting. After irradiation of the module with gamma-rays with the membrane in a wet condition, clearances of urea and of phosphorus and albumin permeability were determined. The in vitro urea clearance was found to be 196 ml/min, phosphorus clearance was 181 ml/min, and albumin permeability was 0.12%. Further, the 1.8 m² conversion clearance, i.e. clearance per area of 1.8 m², of $\beta_2$-MG was 44 ml/min.

EXAMPLE 2

18 Parts of a polysulfone (AMOCO's Udel-P3500) and 9 parts of polyvinylpyrrolidone (BASF K30) were added to 71.70 parts of dimethylacetamide and 1.30 parts of water, and the mixture was heated at 90° C. for 12 hours to dissolve the components into a membrane stock solution. This solution was extruded from an annular spinning orifice of outer diameter 0.3 mm and inner diameter 0.2 m together with a solution consisting of 65 parts of dimethylacetamide and 35 parts of water as a core solution to form a hollow fiber membrane under the same conditions as in Example 1, except that the relative humidity of the air in the dry zone was 73% and the dry zone length was 350 mm. This hollow fiber membrane was inserted in a case to form a module with a membrane area of 1.6 m² through potting. After gamma-ray irradiation with the membrane in a wet state, clearances of urea and of phosphorus and albumin permeability were determined. The in vitro urea clearance was 196 ml/min, phosphorus clearance was 188 ml/min, and albumin permeability was 0.17%. The 1.8 m² conversion clearance of $\beta_2$-MG was 53 ml/min.

EXAMPLE 3

18 Parts of a polysulfone (AMOCO's Udel-P3500) and 12 parts of polyvinylpyrrolidone (BASF K30) were added to 68.55 parts of dimethylacetamide and 1.45 parts of water, and the mixture was heated at 90° C. for 12 hours to dissolve the components into a membrane stock solution. This solution was extruded from an annular spinning orifice of outer diameter 0.3 mm and inner diameter 0.2 mm together with a solution consisting of 65 parts of dimethylacetamide and 32 parts of water as a core solution to form a hollow fiber membrane under the same conditions as in Example 1, except that the relative humidity of the air in the dry zone was 85% and the dry zone length was 350 mm. This hollow fiber membrane was inserted in a case to give a module with a membrane area of 1.6 m² through potting. After gamma-ray irradiation with the membrane in a wet state, clearances of urea and of phosphorus and albumin permeability were determined. The in vitro urea clearance was 197 ml/min, phosphorus clearance was 185 ml/min, and albumin permeability was as 0.32%. The 1.8 m² conversion clearance of $\beta_2$-MG was 59 ml/min.

Comparative Example 1

18 Parts of a polysulfone (AMOCO's Udel-P3500) and 9 parts of polyvinylpyrrolidons (BASF K30) were added to 72.00 parts of dimethylacetamide and 1.0 part of water, and the mixture was heated at 90° C. for 12 hours to dissolve the components and thus give a membrane stock solution. This solution was extruded from an annular spinning orifice of outer diameter 0.3 mm and inner diameter 0.2 mm together with a solution consisting of 65 parts of dimethylacetamide and 35 parts of water as a core solution to form a hollow fiber membrane under the same conditions as in Example 1, except that the relative humidity of the air in the dry zone was 85% and the dry zone length was 350 mm. This hollow fiber membrane was inserted in a case to give a module with a membrane area of 1.6 m² through potting. After gamma-ray irradiation with the module in a wet state, the clearances of urea and of phosphorus and albumin permeability were determined. The urea clearance was 195 ml/min, phosphorus clearance was 181 ml/min, and albumin permeability was 0.12%. The 1.8 m² conversion clearance of $\beta_2$-MG was 42 ml/min.

EXAMPLE 4

18 Parts of a polysulfone (AMOCO's Udel-P3500) and 9 parts of polyvinylpyrrolidone (BASF K30) were added to 71.7 parts of dimethylacetamide and 1.3 parts of water, and the mixture was heated at 90° C. for 12 hours to dissolve the components into a membrane stock solution. This solution was extruded from an annular orifice provided by respective axial ends of a pair of coaxial tubes of outer diameter 0.3 mm and inner diameter 0.2 mm together with a solution consisting of 70 parts of dimethylacetamide and 30 parts of water as a core solution to form a hollow fiber membrane under the same conditions as in Example 1, except that the relative humidity of the air in the dry zone was 85%, the length of the dry zone was 250 mm and the coagulation temperature was 50° C. This hollow fiber membrane was inserted in a case to form a module with a membrane area of 1.6 m² through potting. Next, after gamma-ray radiation in a wet state, the albumin permeability was determined, and it was 0.75%, and in the diffusion test with dextran, the general mass transfer coefficient Ko after 1 hour circulation of bovine serum was, at the dextran molecular weight 10,000, 0.0018 cm/min.

This hollow fiber membrane was confirmed to be a membrane having a spongy structure in the internal layer part, a hydrophilic property provided by polyvinylpyrrolidone, a porosity of 79.5% and an asymmetrical structure with an average pore radius of active layer of 6.7 nm.

EXAMPLE 5

19 Parts of a polysulfone (AMOCO's Udel-P3500) and 9 parts of polyvinylpyrrolidone (BASF K30) were added to 70.7 parts of dimethylacetamide and 1.3 parts of water, and the mixture was heated at 90° C. for 12 hours to dissolve the components and form a membrane stock solution. This solution was extruded from an annular orifice (provided as in Example 4) of outer diameter 0.3 mm and inner diameter 0.2 mm together with a solution consisting of 70 parts of dimethylacetamide and 30 parts of water as a core solution to form a hollow fiber membrane under the same conditions as in Example 1, except that the relative humidity of the air in the dry zone was 85%, the dry zone length was 250 mm and the coagulation temperature was 50° C. This hollow fiber membrane was inserted in a case to give a module with a membrane area of 1.6 m² through potting. Next, after gamma-ray irradiation with the membrane in a wet state, the albumin permeability was measured, and was 0.58%, and in a dextran diffusion test, the general mass transfer coefficient Ko after 1 hour circulation of bovine serum was, for a dextran molecular weight of 10,000, 0.0015 cm/min.

This hollow fiber membrane was confirmed to be a membrane having a spongy structure in the inner layer part, and to have a hydrophilic property provided by the polyvinylpyrrolidone, a porosity of 78.2% and an asymmetrical structure with an active layer having an average pore radius of 6.2 nm.

EXAMPLE 6

19 Parts of a polysulfone (AMOCO's Udel-P3500) and 9 parts of polyvinylpyrrolidone (BASF K60) were added to 70.0 parts of dimethylacetamide and 2.0 parts of water, and the mixture was heated at 90° C. for 12 hours to dissolve the components into a membrane stock solution. This solution was extruded from an annular orifice (provided as in Example 4) of outer diameter 0.3 mm and inner diameter 0.2 mm together with a solution consisting of 63 parts of dimethylacetamide and 37 parts of water as a core solution to form a hollow fiber membrane under the same conditions as in Example 1, except that the dry zone length was 350 mm and the coagulation temperature was 50° C. This hollow fiber membrane was inserted in a case to form a module with a membrane area of 1.6 m$^2$ through potting. Next after gamma-ray irradiation with the membrane in a wet state, the albumin permeability was measured, and was 1.38%, and in a dextran diffusion test, the general mass transfer coefficient Ko after 1 hour circulation of bovine serum was, for a dextran molecular weight of 10,000, 0.0022 cm/min.

This hollow fiber membrane was confirmed to be a membrane having a spongy structure in the internal layer part, a hydrophilic property provided by polyvinylpyrrolidone, a porosity of 81.2% and an asymmetrical structure with an active layer having an average pore radius of 6.8 nm.

Comparative Example 2

18 Parts of a polysulfone (AMOCO's Udel-P3500) and 9 parts of polyvinylpyrrolidone (BASF K30) were added to 71.95 parts of dimethylacetamide and 1.05 parts of water, and the mixture was heated at 90° C. for 12 hours to dissolve the components into a membrane stock solution. This solution was extruded from an annular orifice (provided as in Example 4) of outer diameter 0.3 mm and inner diameter 0.2 mm together with a solution consisting of 65 parts of dimethylacetamide and 35 parts of water as a core solution to form a hollow fiber membrane under the same conditions as in Example 1. This hollow fiber membrane was inserted in a case to form a module with a membrane area of 1.6 m$^2$ through potting. Then, after gamma-ray irradiation with the membrane in a wet state, the albumin permeability was measured and was 0.12%, and in a dextran diffusion test, the general mass transfer coefficient Ko was, after 1 hour circulation of bovine serum, 0.0009 cm/min.

This hollow fiber membrane was confirmed to be a membrane having a spongy structure in the inner layer part, a hydrophilic property provided by the polyvinylpyrrolidone, a porosity of 78.2% and an asymmetrical structure with active layer having an average pore radius of 5.3 nm.

EXAMPLE 7

18 Parts of a polysulfone (AMOCO's "P-3500"), 6 parts of polyvinylpyrrolidone (BASF's "K30"; molecular weight, about 40,000) and 3 parts of polyvinylpyrrolidone (BASF's "K90"; molecular weight, about 1,100,000) were added to a mixed solution of 71.95 parts of dimethylacetamide and 1.05 parts of water, and the mixture heated at 80° C. with stirring for 12 hours to dissolve the components, to prepare a spinning solution. This spinning solution was a homogeneous, slightly opaque but otherwise clear solution of a viscosity of 76.9 poise at 30° C.

This spinning solution was extruded from an annular nozzle spinneret at 30° C., while an infusing solution prepared by mixing 60 parts of dimethylacetamide and 40 parts of water was introduced from a central part of the spinneret nozzle. Setting the length of the dry zone at 250 mm and allowing moist air of a relative. humidity of 88% to flow in the section, spinning was carried out at a speed of 40 m/min. The hollow thread was then led to a coagulation bath (dimethylacetamide/water (weight ratio)=20/80) at a temperature of 40° C., and the hollow thread coming out of the coagulation bath was washed and then immersed in a 68% by weight aqueous solution of glycerine. After removing the excessive glycerine sticking to the surface, a unit hollow fiber element was provided by helically winding a finished false twist polyester yarn of 50 denier 5 filaments (about 88 microns) around 2 hollow fibers in a Z direction at 0.5 winding per 10 mm of hollow fiber. Then, assembling 24 units of such unit hollow fiber elements, the same finished polyester yarn was wound around the assembly nearly at the same pitch in an S direction. By thus providing 2 layers of spacers, an assembly of unit hollow fiber elements was fabricated. By assembly then of 221 assemblies of unit hollow fiber elements, a hollow fiber bundle was provided. This hollow fiber bundle was revolved in a centrifugal separator to remove the aqueous solution of glycerine replacing the infusing solution and sealed in the hollow threads to give a bundle of hollow fibers to be inserted in a hemodialyzer case. This hollow fiber had an inner diameter of 200 microns and an outer diameter of 280 microns, and the hollow fiber bundle had 10,608 hollow fibers assembled in it.

This hollow fiber bundle was inserted in a hemodialysis case of an inner diameter of 40 mm. Then, with a temporary cap fitted to each end of the case, polyurethane was introduced from the inlet of the dialysis solution and then solidified. Removing the temporary caps and cutting off the polyurethane and the end parts of hollow thread bundle coming out of the ends of the case, header caps were fitted, and a leak test was conducted using air at a pressure of 0.8 kg/cm$^2$.

As the result of the leak test using 1000 samples, failures were found in 12 samples. Looking into the cause, they were found to be caused by end breakage and thread cut due to simple failure in work or contact of the hollow fiber bundle with the end part or inner wall of the case when it was inserted in the case, and there was no seal leakage found in the polyurethane sealing plate.

Next, a module found acceptable in the leak test was washed with pure water running through a reverse osmotic membrane for 30 minutes at 80° C. and packed. Then, it was irradiated and sterilized by gamma-rays at a power of 32 KGy, and a hemodialyzer of an effective length of 195 mm and an effective area of 1.3 m$^2$ was provided. This dialyzer was found to be acceptable for all items of the approval standard for hemodialysis apparatus. The water permeability of the hollow fiber cut out of this module was 815 ml/hr.mmHg.m$^2$. The albumin permeability of the module was 1.2%, urea dialyzance was 195 ml/min, and vitamin B$_{12}$ dialyzance was 143 ml/min.

In addition, when this module was used for clinical evaluation, it gave a very high % $\beta_2$-microglobulin removal at 73% and was found usable without any problem such as residual blood.

EXAMPLE 8

18 Parts of a polysulfone (AMOCO's "P-3500") and 9 parts of polyvinylpyrrolidone (BASF's "K-30") were added to a mixed solution of 71.6 parts of dimethylacetamide and 1.40 parts of water, and the mixture was heated at 90° C. with agitation for 12 hours to dissolve the components and form a spinning solution. This spinning solution had a viscosity of 28.4 poise at 30° C. (38.8 poise at 20° C).

This spinning solution was extruded from an annular nozzle spinneret at 30° C., while an infusing solution prepared by mixing 65 parts of dimethylacetamide and 35 parts of water was injected from the central part of the spinneret. The solution emitted from the spinneret entered a dry zone set at a length of 350 mm, where it was exposed to moist air of a relative humidity of 84% in this section. Spinning was carried out at a speed of 40 m/min, and a hemodialyzer was fabricated by a method similar to that in Example 7. However, during the course of fabrication, a leak test was conducted with 1000 samples used. Failures occurred in 17 samples, but the causes were the same with those in Example 7.

The thus obtained dialyzer of an effective area of 1.3 m$^2$ was found acceptable for all items of the approval standard of hemodialyzers. The water permeability of the hollow fiber cut out of the dialyzer was 10 ml/hr.mmHg.m$^2$, and the albumin permeability of the module was 0.4%, and the urea and vitamin $B_{12}$ dialyzances were respectively 194 ml/min and 139 ml/min. In the clinical evaluation of this module, it gave a % $\beta_2$-microglobulin removal of 67% and was found usable without any problem such as residual blood.

EXAMPLE 9

18 Parts of a polysulfone (AMOCO's "P-3500") and 9 parts of a polyvinylpyrrolidone (BASF's "K-30") were added to a mixed solution of 71.8 parts of dimethylacetamide and 1.2 parts of water, and the mixture was heated at 80° C. with agitation for 12 hours to dissolve the components and form a spinning solution. This solution had a viscosity of 26.8 poise at 30° C. Then, using as an infusing solution, a composition of 60 parts of dimethylacetamide and 40 parts of water, a hemodialyzer was prepared by a method similar to that in Example 7.

The water permeability of the hollow fiber cut out of this dialyzer was 740 ml/hr.mmHg.m$^2$, the albumin permeability of the module was 0.1%, and the urea and vitamin $B_{12}$ dialyzances were respectively 192 ml/min and 136 ml/min, per area of 1.3 m$^2$. When this module was used for a clinical test, it gave a % $\beta_2$-microglobulin removal of 62% and was found usable without any problem such as residual blood.

EXAMPLE 10

Assembling 170 and 306 bundles of hollow fibers in the course of process of Example 7, bundles of hollow fibers were prepared, and they were inserted in hemodialysis eases of inner diameter 35.5 mm and 46.5 mm respectively to produce hemodialyzers by the same method as that in Example 7.

The effective areas were respectively 1.0 m$^2$ and 1.8 m$^2$, and when the vitamin $B_{12}$ dialyzances were measured, they were 127 ml/min and 165 ml/min.

EXAMPLE 11

Using the bundle of hollow fibers in the course of process of Example 9 but changing the assembled number of fibers, bundles of hollow fibers were prepared. Then, they were inserted in hemodialysis cases of inner diameters of 35.5 mm, 44.0 mm and 46.5 mm, and hemodialyzers with effective areas of 1.0 m$^2$, 1.6 m$^2$ and 1.8 m$^2$ were prepared by the same method as that in Example 9.

Measuring the urea and vitamin B12 dialyzances and albumin permeabilities, the urea dialyzances were 187 m/min, 195 ml/min and 197 ml/min; vitamin $B_{12}$ dialyzance were 122 ml/min, 147 ml/min and 156 ml/min; and albumin permeabilities were 0.2%, 0.1% and 0.2%, respectively.

Comparative Example 3

18 Parts of a polysulfone (AMOCO's "P-3500") and 9 parts of a polyvinylpyrrolidone (BASF's "K-30") were added to a mixed solution of 44 parts of dimethylacetamide, 28 parts of dimethylsulfoxide and 1.0 part of water, and the mixture was heated at 80° C. with agitation for 15 hours to dissolve the components and form a spinning solution. This spinning solution had a viscosity of 32.9 poise at 30° C. This spinning solution was extruded from an annular orifice nozzle spinneret at 30° C., while, as an infusing solution, an admixture of 60 parts of dimethylacetamide and 40 parts of water was injected through the central part of the spinneret. Then, a hemodialyzer was prepared by the same method as that in Example 7.

The water permeability of the hollow fiber cut out of the dialyzer was 830 ml/hr.mmHg.m$^2$, the albumin permeability of the module was 0.2% and the vitamin $B_{12}$ dialyzance was 132 ml/min. In a clinical test to which this module was subjected, the $\beta_2$-microglobulin removal rate was as low as 49%.

Comparative Example 4

After washing the coagulated and desolvated hollow thread of Example 7, it was immersed in a 45% by weight aqueous solution of glycerine. After the excessive glycerine sticking to the surface was removed, it was taken on a hexagonal hank, each side of which had a length of 60 cm, and air dried at room temperature. Then, by cutting it out of the hank, a bundle of hollow fibers was prepared. This hollow fiber bundle was an assembly of 10,608 hollow fibers. The hollow fiber bundle was inserted in a hemodialysis case of an inner diameter of 40 mm, and dry air was blown vertically to both end faces of the hollow fiber bundle to loosen the end parts. Then, sealing plates were formed by the same method as that in Example 7. Introducing pressure air from the dialyzate side and filling water to the blood side, a leak test was made according to the bubble point method. Then, through the gamma-ray sterilization by the same method as that in Example 7, a hemodialyzer was prepared.

The water permeability of the hollow fiber cut out of this module was 410 ml/hr.mmHg.m$^2$, albumin permeability was 0.3%, urea dialyzance was 190 ml/min, and vitamin $B_{12}$ dialyzance was 125 ml/min. These values of water permeability and urea and vitamin $B_{12}$ dialyzance were all relatively low. That is, when a low concentration of glycerine is added, the tube plate may be formed readily without spacers, but deterioration in the permeability of the hollow fiber occurred due to drying. Thus it was difficult to produce a hemodialyzer of high performance such as that according to the present invention.

We claim:

1. A hollow fiber membrane characterized by,
   (i) an albumin permeability no more than 0.5%;
   (ii) per membrane area of 1.6 m$^2$, an in vitro urea clearance of at least 195 ml/min;
   (iii) per membrane area of 1.6 m$^2$, an in vitro phosphorus clearance of at least 180 ml/min;
   (iv) per membrane area of 1.8 m$^2$, a $\beta_2$-microglobulin clearance of at least 44 ml/min.

2. A hollow fiber membrane according to claim 1, which comprises a polysulfone resin.

3. A hollow fiber membrane according to claim 2, which comprises a polysulfone and a hydrophilic polymer.

4. A hollow fiber membrane according to claim 3, wherein the hydrophilic polymer comprises polyvinylpyrrolidone.

5. A hollow fiber membrane according to claim 3, wherein the hydrophilic polymer is cross-linked.

6. In a method, for the treatment of blood to remove therefrom undesired material, in which blood is separated from dialysate by a hollow fiber membrane capable of allowing selective passage across said membrane the improvement comprising using a hollow fiber membrane characterized by (i) an albumin permeability no more than 0.5%;

(ii) per membrane area of 1.6 $m^2$, an in vitro urea clearance of at least 195 ml/min;

(iii) per membrane area of 1.6 $m^2$, an in vitro phosphorus clearance of at least 180 ml/min;

(iv) per membrane area of 1.8 $m^2$, a $\beta_2$-microglobulin clearance of at least 44 ml/min.

7. A polysulfone hollow fiber semipermeable membrane characterized by an albumin permeability of less than 1.5% and, in a dextran diffusion test using a dextran having a molecular weight of 10,000 and after 1 hour circulation of bovine serum, and overall mass transfer coefficient Ko of at least 0.0012 cm/min, and having a $\beta$-microglobulin clearance of at least 44 ml/min, per membrane area of 1.8 m2.

8. A polysulfone hollow fiber membrane according to claim 7, wherein the membrane has a hydrophilic property provided by a hydrophilic polymer, a porosity of at least 78% and an asymmetrical structure including an active layer thereof, which active layer has an average pore radius of less than 10 nm.

9. In a method for treatment of blood to remove therefrom undesired material, in which blood is separated from dialysate by a hollow fiber membrane capable of allowing selective passage across said membrane characterized by an albumin permeability of less than 1.5% and, in a dextran diffusion test using a destran having a molecular weight of 10,000 and after 1 hour circulation of bovine serum, and overal mass transfer coefficient Ko of at least 0.0012 cm/min, and having a $\beta$-microglobulin clearance of at least 44 ml/min, per membrane area of 1.8 m2.

10. A polysulfone hollow fiber membrane containing a hydrophilic polymer in the membrane characterized by an albumin permeability of no more than 3.0% and a vitamin $B_{12}$ dialyzance of at least 135 ml/min per membrane area of 1.3 $m^2$, the vitamin $B_{12}$ dialyzance being measured during dialysis using, as perfusate, an aqueous solution containing urea and vitamin $B_{12}$ at a perfusate flow rate of 200 ml/min, and using, as a dialyate, water at a dialysate flow rate of 500 ml/min and a filtration speed of 10 ml/min.

11. A polysulfone hollow fiber membrane according to claim 10, having an albumin permeability of 0.1% to 2.4% and a vitamin $B_{12}$ dialyzance of at least 137 ml/min per membrane area of 1.3 $m^2$.

12. A polyoulfone hollow fiber membrane according to claim 11 having an albumin permeability of 0.3% to 2.0% and a vitamin $B_{12}$ dialyzance of at least 140 ml/min in a module per membrane area of 1.3 $m^2$.

13. A polysulfone hollow fiber membrane according to claim 10, wherein the urea dialyzance per membrane area of 1.3 $m^2$ is at least 191 ml/min, the urea dialyzance being measured during dialysis of blood containing added urea and vitamin $B_{12}$ at a blood flow rate of 200 ml/min, using water as a dialysate at a dialysate flow rate of 500 ml/min and a filtration speed of 10 mi/min.

14. A polysulfone hollow fiber membrane according to claim 13, wherein the urea dialyzance per membrane area of 1.3 $m^2$ is at least 192 ml/min.

15. A polysulfone hollow fiber membrane according to claim 14, wherein the urea dialyzance in a module of a membrane area of 1.3 $m^2$ is at least 193 ml/min.

16. A polysulfone hollow fiber membrane according to claim 10, wherein the water permeability of the hollow fiber is at least 500 ml/hr.mmHg.$m^2$.

17. A polysulfone hollow fiber membrane according to claim 15, wherein the water permeability of the hollow fiber is at least 600 ml/hr.mmHg.$m^2$.

18. A polysulfone hollow fiber membrane according to claim 17, wherein the water permeability of the hollow fiber is at least 700 ml/hr.mmHg.$m^2$.

19. A polysulfone hollow fiber membrane according to claim 17, wherein the said % $\beta_2$-microglobulin removal is at least 70%.

20. A polysulfone hollow fiber membrane according to claim 10, having a % $\beta_2$-microglobulin removal, in clinical use for blood dialysis with a module per membrane area of 1.3 $m^2$, of at least 60%.

21. A polysulfone hollow fiber membrane according to claim 10, wherein the hydrophilic polymer is polyvinylpyrrolidone.

22. In a method, for the treatment of blood to remove therefrom undesired material, in which blood is separated from dialysate by a hollow fiber membrane capable of allowing selective passage across said membrane the improvement comprising using a hollow fiber membrane containing in the membrane a hydrophilic polymer and characterized by an albumin permeability of no more than 3.0% and a vitamin $B_{12}$ dialyzance of at least 135 ml/min per membrane area of 1.3 $m^2$, the vitamin $B_{12}$ dialyzance being measured during dialysis of blood containing added urea and vitamin $B_{12}$ at a blood flow rate of 200 ml/min, using water as a dialysate at a dialysate flow rate of 500 ml/min and a filtration speed of 10 ml/min.

* * * * *